United States Patent [19]
De Leon

[11] Patent Number: 5,813,430
[45] Date of Patent: Sep. 29, 1998

[54] ADJUSTABLE DUCT DAMPER

[76] Inventor: Arthur P. De Leon, 2179 Fitzgerald Rd., Simi Valley, Calif. 93065

[21] Appl. No.: 813,661

[22] Filed: Mar. 7, 1997

[51] Int. Cl.⁶ ........................................... F16K 1/22
[52] U.S. Cl. ................................ 137/318; 251/305
[58] Field of Search ........................ 251/305; 137/315, 137/318

[56] References Cited

U.S. PATENT DOCUMENTS

| | | | |
|---|---|---|---|
| 4,155,373 | 5/1979 | Digiovanni | 137/318 X |
| 4,213,477 | 7/1980 | Velasquez | 137/318 X |
| 4,272,021 | 6/1981 | Standal | 239/106 |
| 4,522,116 | 6/1985 | Tartaglino | 98/39.1 |
| 5,170,986 | 12/1992 | Zelczer et al. | 251/61.1 |
| 5,348,270 | 9/1994 | Dinh | 251/61.1 |
| 5,524,663 | 6/1996 | Walsh et al. | 137/315 X |

*Primary Examiner*—John Fox
*Attorney, Agent, or Firm*—Jack C. Munro

[57] ABSTRACT

The subject invention is a damper apparatus which includes an expandable, rigid frame mounted on an elongated rod. A sheet material flexible cover covers the frame. With the frame located in a collapsed configuration, the frame and cover are inserted through a hole in a duct, and, once inside the duct, the frame is expanded with the cover tightly encasing the frame. With the frame expanded, the cross-sectional area of the duct can be substantially completely closed. The covered frame can be pivoted to any desired position and caused to remain in that position which will function to restrict the flow of fluid through the duct.

12 Claims, 3 Drawing Sheets

ADJUSTABLE DUCT DAMPER

BACKGROUND OF THE INVENTION

1. Field of the Invention

The present invention relates to duct dampers and more particularly to an adjustable duct damper capable of providing variable restriction of fluid flowing through a duct.

2. Description of the Prior Art

The subject of the present invention is going to be described in relation to an air duct. However, it is considered to be within the scope of this invention that this invention could be used in other types of fluid ducts.

Ventilation in homes and buildings requires that air be circulated and distributed according to the requirements of the different parts of the home or building. The air flow into a room of a home or building depends upon (1) its proximity to the source of the air flow, (2) the cross-sectional area of the ventilation duct connecting to the room, (3) the position of the room relative to the sun (whether the room gets the afternoon sun or the morning sun). The flow rates of air into different rooms are controlled by way of dampers. Each ventilation duct to each room includes a damper, and also there may be included dampers within the larger volume supply ducts accessing the individual room ducts.

Typically, when a home or building is being constructed, an air conditioning contractor installs the duct work according to an architectural plan deemed to be required for that structure. Installers may forget to place one or more dampers within the ducting during the installation of new duct work. The dampers are intended to be installed as the ducting is assembled. In the past, once the ducting was completely assembled, it was exceedingly difficult to then install a damper without having to completely tear apart sections of the ducting.

Additionally, once a ventilation system for a home or building has been completely installed and then activated, it may be discovered that a given room of the home or building is receiving too much air, whereas another room of the home or building is receiving too little air. The dampers are used to vary the airflow to each individual room so that each room of the home or building receives the desirable amount of heating or cooling.

In the past, it has been known to install within duct work an inflatable damper in the form of a balloon. A hole is made through the sidewall of the duct and the balloon is inserted therein. The balloon is then inflated with this inflation to be at a level to restrict the airflow within the duct to achieve the desired amount of ventilation for any room of the home or building. The problem with inflatable dampers is the air temperature and the size of the damper vary significantly. In other words, if cooling air moves through the duct, the damper will get smaller in size because the air inside the balloon contracts to a smaller volume. Therefore, the air passage that is being restricted within the duct becomes larger and the room in the home or building will receive more of the cooling air. This means that the room of the home or building will, in all probability, become cooler than desired. In contrast, if heated air is being applied to the room of the home or building, the air in the balloon expands causing the balloon to further restrict the passage of the duct resulting in less ventilation air being supplied to the room. This will result in inadequate heating of the room.

SUMMARY OF THE INVENTION

One of the primary objectives of the present invention is to construct a damper apparatus that is intended to be installed within duct work after the duct work has been completely assembled.

Another objective of the present invention is to utilize a damper apparatus that does not react by expanding or contracting as heated or cooled air flows through the duct.

Another objective of the present invention is to provide a damper apparatus that can be easily retrofitted into an existing ventilation duct.

Another objective of the present invention is to mount a damper apparatus within a duct that is similar in construction and shape to the damper apparatus that should have been installed in the duct during its initial assemblage.

Another objective of the present invention is to install a damper apparatus into an existing duct and then permit, if necessary, removal of that damper apparatus subsequent to its installation.

Another objective of the present invention is to provide a damper apparatus that can be installed within a ducting system that does necessitate separating any portion of the ducting to install the damper apparatus which is a time consuming process, especially after the ducting joints have been sealed.

The damper apparatus of the present invention utilizes a main support member comprising an elongated rod. The elongated rod has a pointed outer end with a fixed member being mounted on the rod directly adjacent this outer end. A movable member is also mounted on the rod directly adjacent the inner end of the rod. In between the movable member and the fixed member is mounted a frame with generally this frame comprising a pair of stainless steel spring-like strip members. These spring-like strip members are mounted within a sheet material flexible cover. The spring-like strip members can be located in a collapsed position parallel to and located directly adjacent the elongated rod and in the expanded position where the spring-like strip members assume a bowed configuration. Movement of the spring-like strip members between the collapsed position and expanded configuration is to be achieved by manually moving of the movable member on the elongated rod. With the spring-like strip members in the expanded position, the sheet material flexible cover tightly encases the spring-like strip members forming a plate-like or disc shaped damper element. The movable member is then fixed in position. The outer end of the threaded rod is mounted within a hole that is formed within the duct in alignment with the installing hole located opposite the location of the installing hole. With the damper element in the expanded configuration, it can be moved within the passageway of the duct from a position totally blocking the flow of fluid through the duct to a non-restrictive position where the damper element would be aligned with the direction of airflow through the duct. When the damper element is located transverse to the direction of airflow, substantial blocking of the airflow occurs.

DETAILED DESCRIPTION OF THE PREFERRED EMBODIMENT

Figure 1:
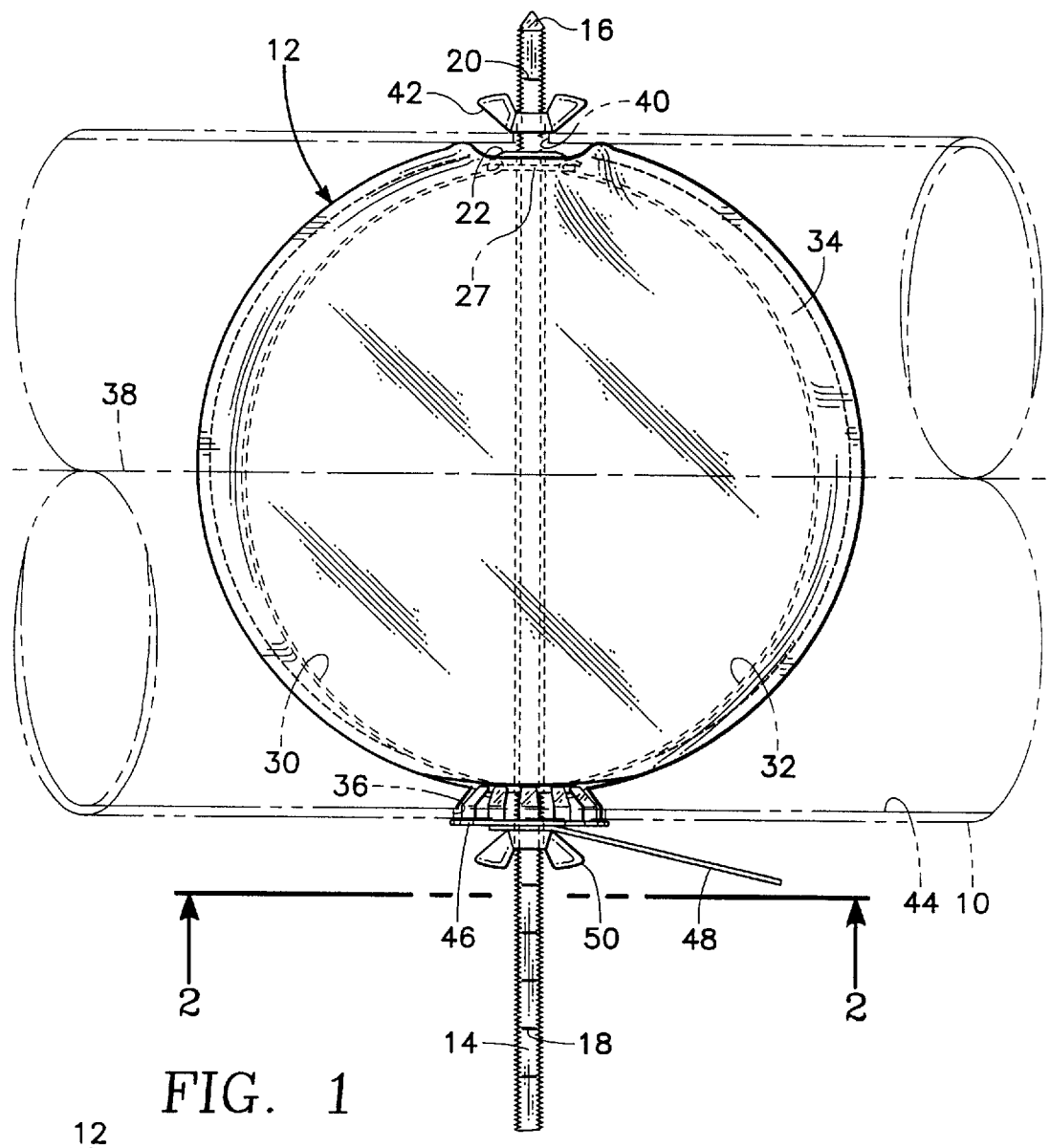
FIG. 1 is a top plan view of the damper apparatus of the present invention showing the damper element installed within a duct with the damper element being located in the position of minimal restriction of the flow of fluid through the duct.
Figure 2:
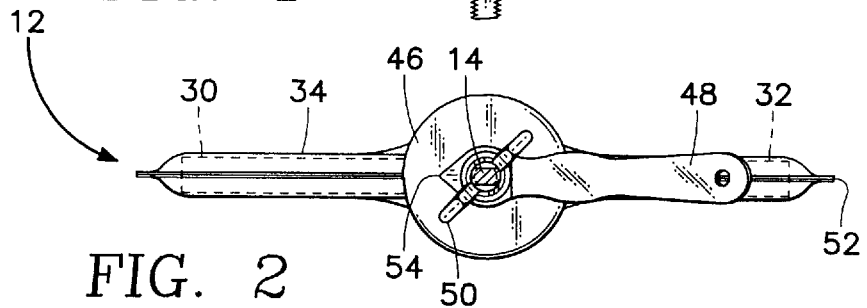
FIG. 2 is a front end view, partly in cross-section, of the damper apparatus of this invention taken along line 2—2 of FIG. 1.

Referring particularly to the drawings, there is depicted in phantom lines a duct 10. Typically, the duct 10 would be of a circular cross-section and will have a diameter of between four and twelve inches. However, it is considered to be within the scope of this invention that the cross-sectional configuration of the duct 10 could be other than circular such as hexagonal, octagonal and possibly even square. In the situation of the square duct, the damper apparatus 12 would have to be modified so as to conform to the internal dimension of the duct 10.

The main supporting component of the damper apparatus 12 is an elongated rod 14. The elongated rod 14 is generally no more than about one-quarter of an inch in diameter. The length of the elongated rod 14 is greater than the diameter of the duct 10. The elongated rod 14 is preferably threaded on the exterior surface. The outer end 16 of the elongated rod 14 is to be sharply pointed, and it is preferable that the outer end 16 be formed to resemble a conventional drill bit or hole tap. The reason for this construction of the outer end 16 will be explained further on in the specification. The inner end of the elongated rod 14 includes a series of score lines 18. A similar score line 20 is formed within the outer end of the elongated rod 14. The function of the score lines 18 and 20 will be explained further on in the specification.

Fixedly mounted directly adjacent the outer end of the elongated rod 14 is a fixed member 27. The fixed member 27 is fixedly secured to the elongated rod 14. The fixed member 27 generally takes the form of a disc shaped member which includes a center hole 24. The elongated rod 14 passes through the center hole 24.

A movable member 26, which is basically disc shaped with the exception of having chamfered sides, has a center hole 28. The elongated rod 14 is conducted through the center hole 28. The movable member 26 is slidably movable on the elongated rod 14. A frame which is composed of strips 30 and 32 is mounted between the fixed member 22 and the movable member 26. Each strip 30 and 32 terminates in a hooked end with these hooked ends being used to mount the strips 30 and 32 to the fixed member 22 and the movable member 26. The strips are normally about one quarter to one-half inch wide and would normally be constructed of stainless steel. Although the strips are basically rigid, they are bendable. Relative to the elongated rod 14, the strips 30 and 32 are located diametrically apart, meaning that they are about one hundred eighty degrees opposite each other. Also, the strips 30 and 32 are located in an oppositely facing relationship relative to each other.

Figure 3:
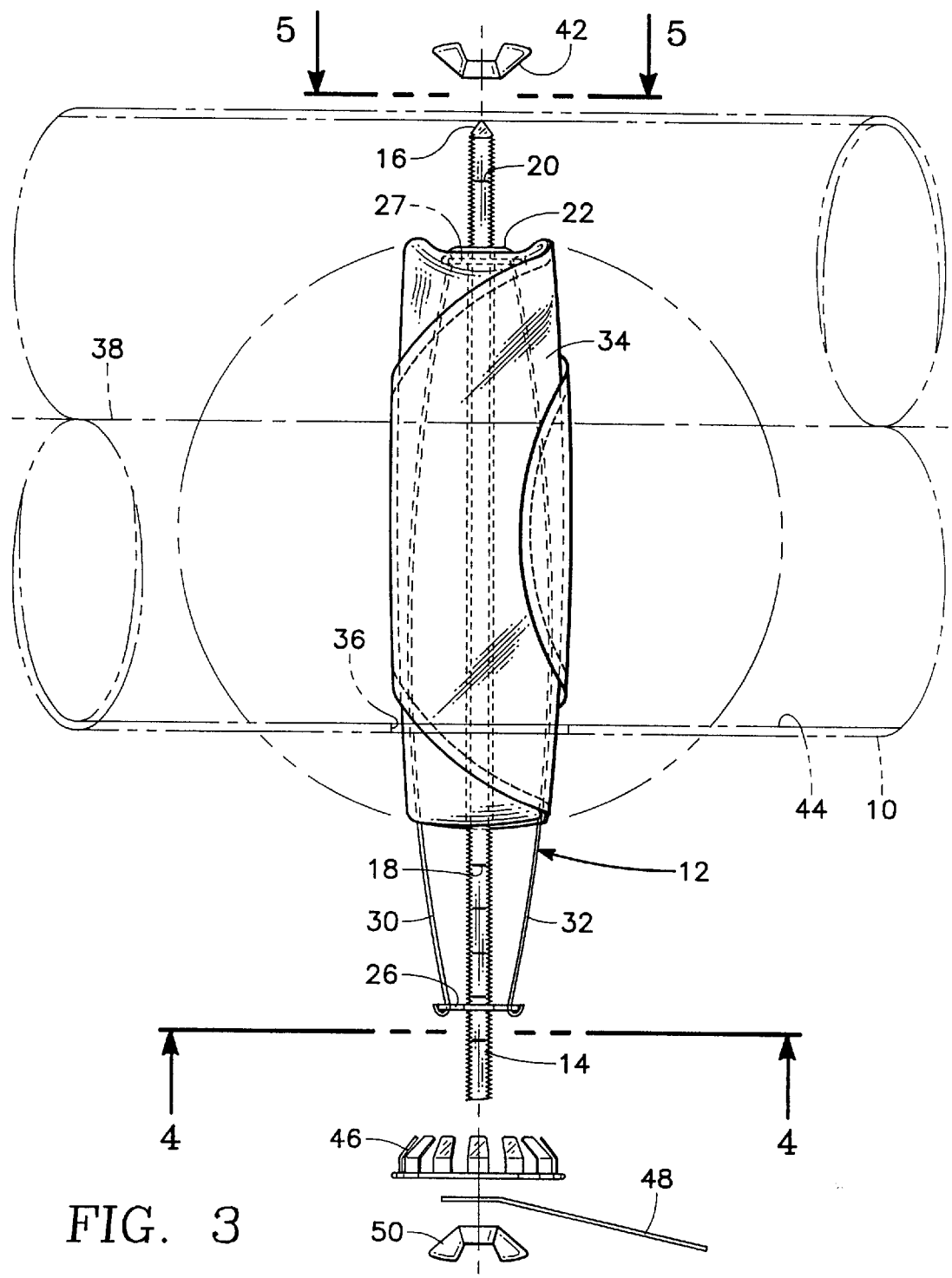
FIG. 3 is an exploded top plan view of the damper apparatus of the present invention showing the damper apparatus in the collapsed configuration and in the process of being installed within a duct.
Figure 4:
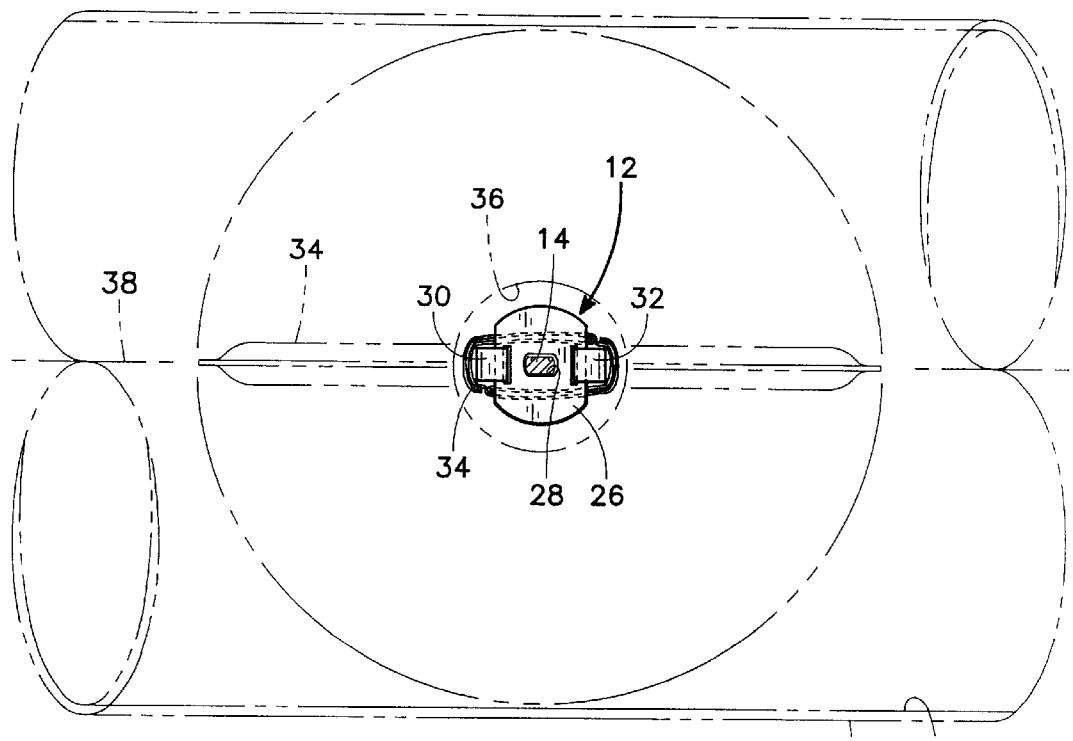
FIG. 4 is a front end view, partly in cross-section, of the damper apparatus taken along line 4—4 of FIG. 3.

The basic at-rest position of the strips 30 and 32 is shown in FIG. 3. The strips 30 and 32, though slightly bowed, do assume substantially a parallel relationship relative to the elongated rod 14. Also, the strips 30 and 32 are located directly adjacent the elongated rod 14.

A sheet material flexible cover 34, which has a shape of a thin disc, has an upper hole (not shown) within which is mounted a brass grommet 22 and through which the elongated rod 14 is conducted. The brass grommet 22 is to abut against the fixed member 27. The cover 34 also includes a lower hole, also not readily observable, with this lower hole being located directly adjacent the movable member 26.

The operation of the damper apparatus 12 of this invention is as follows: A hole 36, generally between one and one-quarter and one and one-half inches in diameter, is formed within the sidewall of the duct 10. The installer places the damper apparatus 12 in the position shown in FIG. 3 with the cover 34 being wrapped about the frame composed of strips 30 and 32. Also, the strips 30 and 32 are located in the collapsed position that is substantially parallel to and directly adjacent the elongated rod 14. The installer then inserts the outer end of the elongated rod 14 through the hole 36 until the sharply pointed outer end 16 abuts against the inside wall surface of the duct 10, as is clearly shown in FIG. 3 of the drawings. The outer end 16 is positioned so that a line drawn from the point of contact with the inner wall surface of the duct 10 and the center of the hole 36 will pass directly through the longitudinal center axis 38 of the duct 10. An electric drill (not shown) is to be connected to the inner end of the elongated rod 14. The electric drill, when activated, will then cause the outer end 16 to penetrate the wall surface of the duct 10 and produce a hole 40. The size of the hole 40 is substantially smaller than the size of the hole 36 with the hole 40 size being slightly greater than the diameter of elongated rod 14, about one-quarter inch in diameter.

After the hole 40 is created, the outer end 16 of the elongated rod 14 will protrude from the exterior wall surface of the duct 10 as is clearly shown in FIG. 1 of the drawings. When this occurs, a wing nut 42 is to be threaded on the outer end of the elongated rod 14 with this wing nut 42 to be snugly mounted against the exterior wall surface of the duct 10. The installer then grasps the movable member 26 and moves such toward the fixed member 22. This will cause the strips 30 and 32 to bow outwardly, and upon continued movement of the movable member 26, the strips 30 and 32 will actually assume a basic circular configuration which is slightly smaller than the internal diameter of the duct 10. Also in this position, the strips 30 and 32 are totally confined within the internal passage 44 of the duct 10 as is clearly shown in FIG. 1 of the drawings.

Figure 5:
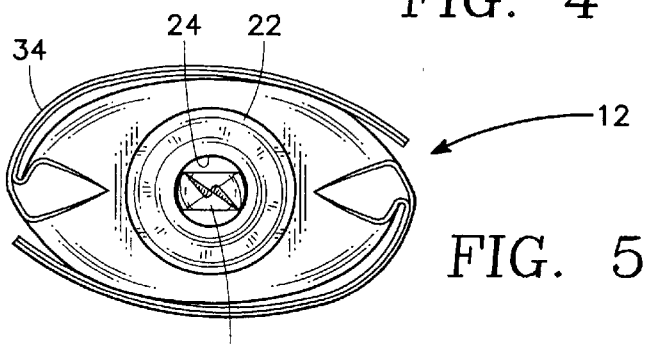
FIG. 5 is a rear end view of the damper apparatus of this invention taken along line 5—5 of FIG. 3.
Figure 6:
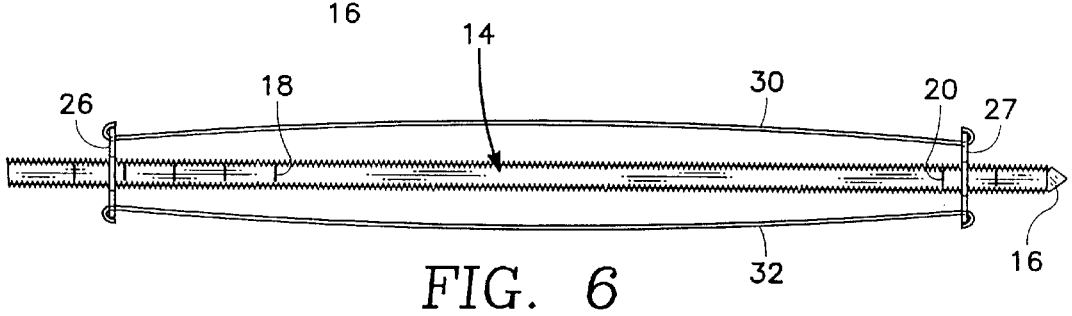
FIG. 6 is an isometric view of the frame in a collapsed configuration relative to the rod on that it is supported which is utilized as the main support structure for the damper element.

With the strips 30 and 32 now assuming substantially the circular bowed configuration, the cover 34 is expanded and has been moved from the overlapped configuration about the strips 30 and 32, as is shown in FIGS. 3 and 5 of the drawings. The cover 34 now tightly encases the strips 30 and 32 in this expanded bow-shaped configuration with the net result that the cover 34 is basically in the shape of an enlarged disc. This enlarged disc configuration, which comprises the damper element, is totally confined within the internal passage 44.

It is desirable to maintain this enlarged disc configuration. To accomplish this, the plug 46, which has a center hole (not shown), has the elongated rod 14 conducted through this center hole. The plug 46 is mounted on the inner end of the elongated rod 14 until the body of the plug 46 is snugly mounted within the hole 36. A handle 48 is then mounted on the inner end of the elongated rod 14 and abuts against the exterior surface of the plug 46. A wing nut 50 is threadably mounted on the inner end of the elongated rod 14 with this wing nut 50 being tightened against the handle 48 and the plug 46. The movable member 26 is then fixed in position and the enlarged disc shape of the cover 34 is then maintained. It is to be noted that the cover 34 is actually composed of two flat circular pieces of material which are sewn together at the peripheral edge forming a seam 52. Typical material for the cover 34 would be fabrics which are commonly sold under the trade names of Excelon, Neoprene, Durolon, Insulflex and Thermafab. In low temperature environments, the desirable material may comprise Excelon or Insulflex. In somewhat higher temperature environments, the most desirable material may be Neoprene or Durolon. In exceedingly high temperature environments, the preferable material would probably be Thermafab.

The handle 48 can be pivoted relative to the plug 46. The handle 48 includes an arrow 54. The handle 48 has a non-circular hole which engages the flattened sides of the elongated rod 14. Pivoting of this handle 48 will also pivot the elongated rod 14. The arrow 54 is to align with the flat plane of the enlarged disc of the cover 34 when in the expanded state shown in FIG. 1. The installer can then turn the handle 48 and position the arrow 54 relative to the duct 10 which will indicate to the installer the position of the enlarged disc which cannot be directly observed. In other words, with the arrow 54 pointing at basically a right angle to the duct 10, the user is made aware that the enlarged disc is located at a transverse position totally cutting off the fluid flow within the passage 44 (the fully closed position). However, with the arrow 54 generally oriented substantially parallel to the longitudinal center axis 38, the installer is made aware that the enlarged disc of the damper apparatus is located in line with the longitudinal center axis 38, minimally restricting the flow of fluid through the passage 44 (the fully open position). In most instances, the arrow 54 will be positioned in between the totally closed position and the totally open position so that the fluid flow in the passage 44 is restricted to some desired degree.

The amount of air flow is achieved by merely operating the heating and air conditioning system and establishing the position of the enlarged disc of the damper apparatus 12 to achieve the precise amount of air being discharged from the duct 10. It is to be understood that if it is necessary to remove the damper apparatus 12, the wing nuts 50 and 42 can be removed as well as the handle 48 and the plug 46, and the movable member 26 can then be moved to the outer position as shown in FIG. 3 of the drawings and the elongated rod 14 can then be twisted resulting in the cover 34 being wrapped about the frame composed of the strips 30 and 32 and then the damper apparatus 12 can then be extracted from the passage 44.

After the damper apparatus 12 has been installed within the passage 44, the extra lengths of the outer end 16 and the inner end of the elongated rod 14 are not necessary. The score lines 18 and 20 are provided so that the installer can literally break off these extra lengths of the elongated rod 14 and discard such.

It is to be understood that the damper apparatus 12 of this invention is to control the volume of airflow within the duct branches and even within main supply conduits of the ducting. The damper apparatus 12 of this invention could be utilized within one duct where it forks and the damper apparatus 12 could be installed as a splitter to divert the fluid flow between the forked branches thereby splitting the fluid flow. The damper apparatus 12 of this invention could also be mounted within fluid ducts in a completely closed position thereby not permitting airflow to be further conducted in the duct (commonly referred to as "dead heading").

What is claimed is:

1. A damper to be installed into a fluid conducting duct to restrict the flow of fluid through the duct, said damper comprising:

an elongated rod having an outer end and an inner end, a fixed member fixedly mounted on said elongated rod directly adjacent said outer end, a movable member movably mounted on said elongated rod directly adjacent said inner end;

a frame mounted on said fixed member and said movable member and extending therebetween, said frame being expandable from a collapsed position to an extended position, said collapsed position locating said frame substantially parallel to said elongated rod and directly adjacent to said elongated rod, said extended position locating said frame in a bowed configuration relative to said elongated rod, said frame being movable between said collapsed position and said extended position by moving of said movable member;

a thin sheet material cover mounted on said frame, said cover being flexible, said cover closely conforming about said frame when said frame is in said extended position, said cover being wrappable about said frame when said frame is in said collapsed position, whereby a pair of aligned holes are formed within the duct and with the frame in said collapsed position and said cover wrapped around said frame the said frame and said cover are inserted through one of the holes and totally located within the duct and the said outer end is to engage with the other of said holes, whereby said movable member is then moved causing said frame to be located in said extended position, whereby said frame and said cover in said extended position is to be pivotable relative to the duct and fixable in any established position between a position substantially closing the duct to an open position essentially not restricting of fluid flow through the duct; and locking means mounted on said elongated rod, said locking means for maintaining said frame in said extended position and fixing of said frame.

2. The damper as defined in claim 1 wherein:

said elongated rod being threaded, said movable member being threadably mounted on said elongated rod.

3. The damper as defined in claim 1 wherein:

said frame comprising a pair of thin, bendable strips, said strips being located diametrically opposite each other and in a facing relationship relative to said elongated rod.

4. The damper as defined in claim 1 wherein:

said bowed configuration being circular.

5. The damper as defined in claim 1 wherein:

handle means mounted on said threaded rod, said handle means to be manually used to pivot said frame between said closed position and said open position.

6. The damper as defined in claim 1 wherein:

said outer end of said elongated rod formed into a drill bit, said drill bit to be used to form the other of the holes in the duct.

7. In combination with the fluid duct, said duct having a longitudinal center axis, said duct having a sidewall enclosing a fluid conducting through passage, a damper to be mounted within said through passage, said damper comprising:

a first hole formed within said sidewall, a second hole formed within said sidewall, said first and second holes are transversely aligned with said longitudinal center axis;

an elongated rod having an outer end and an inner end, a fixed member fixedly mounted on said elongated rod directly adjacent said outer end, a movable member movably mounted on said elongated rod directly adjacent said inner end;

a frame mounted on said fixed member and said movable member and extending therebetween, said frame being expandable from a collapsed position to an extended position, said collapsed position locating said frame substantially parallel and directly adjacent to said elongated rod, said extended position locating said frame in a bowed configuration relative to said elongated rod, said frame being movable between said collapsed position and said extended position by moving of said movable member;

a thin sheet material cover mounted on said frame, said cover closely conforming about said frame when said frame is in the extended position, said cover being wrappable about said frame when said frame is in said collapsed position, when said frame is in said collapsed position and said cover is wrapped about said frame, said frame and said cover are to be inserted through said second hole and totally located within said duct, said outer end to engage with said first hole, whereby said movable member is then moved causing said frame to be located in said extended position; and locking means mounted on said elongated rod, said locking means for maintaining said frame in said extended position and fixing of said frame.

8. The combination as defined in claim 7 wherein:

said second hole being larger in size than said first hole.

9. The combination as defined in claim 7 wherein:

said duct being circular.

10. The combination as defined in claim 7 wherein:

said frame comprising a pair of thin, bendable strips, said strips being located diametrically opposite each other and in a facing relationship relative to said elongated rod.

11. The combination as defined in claim 7 wherein:

handle means mounted on said threaded rod, said handle means to be manually used to pivot said frame between said closed position and said open position.

12. The combination as defined in claim 7 wherein:

said outer end of said elongated rod formed into a drill bit, said drill bit to be used to form said first hole.

\* \* \* \* \*